(12) United States Patent
Lombardo

(10) Patent No.: US 6,514,301 B1
(45) Date of Patent: Feb. 4, 2003

(54) FOAM SEMICONDUCTOR POLISHING BELTS AND PADS

(75) Inventor: Brian Lombardo, Amherst, NH (US)

(73) Assignee: Peripheral Products Inc., Salem, NH (US)

( * ) Notice: Subject to any disclaimer, the term of this patent is extended or adjusted under 35 U.S.C. 154(b) by 0 days.

(21) Appl. No.: 09/317,973

(22) Filed: May 25, 1999

Related U.S. Application Data

(60) Provisional application No. 60/087,740, filed on Jun. 2, 1998.

(51) Int. Cl.$^7$ ................................................ B24D 11/00
(52) U.S. Cl. ............................ 51/295; 51/296; 51/298; 451/526; 451/533; 451/539
(58) Field of Search ................................ 451/526, 533; 51/296, 298, 300

(56) References Cited

U.S. PATENT DOCUMENTS

| | | | |
|---|---|---|---|
| 2,834,748 A | 5/1958 | Bailey et al. | |
| 2,846,458 A | 8/1958 | Haluska | |
| 2,868,824 A | 1/1959 | Haluska | |
| 2,917,480 A | 12/1959 | Bailey et al. | |
| 3,772,224 A | 11/1973 | Marlin et al. | |
| 3,803,064 A | 4/1974 | Fishbein et al. | |
| 3,821,130 A | 6/1974 | Barron et al. | |
| 3,928,258 A | 12/1975 | Alexander | |
| 3,929,026 A * | 12/1975 | Hofmann | 198/847 |
| 3,940,349 A | 2/1976 | Corbett | |
| 3,943,075 A | 3/1976 | Fishbein et al. | |
| 3,947,386 A | 3/1976 | Prokai et al. | |
| 3,957,842 A | 5/1976 | Prokai et al. | |
| 4,022,722 A | 5/1977 | Prokai et al. | |
| 4,022,941 A | 5/1977 | Prokai et al. | |
| 4,038,238 A | 7/1977 | Cravens | |
| 4,138,228 A * | 2/1979 | Hartfelt et al. | 51/295 |
| 4,216,177 A | 8/1980 | Otto | 264/25 |
| 4,275,172 A | 6/1981 | Barth et al. | |
| 4,374,209 A | 2/1983 | Rowlands | |
| 4,412,962 A | 11/1983 | Bessette et al. | |
| 4,546,118 A | 10/1985 | Simpson et al. | |
| 4,576,612 A | 3/1986 | Shukla et al. | 51/295 |
| 4,613,345 A | 9/1986 | Thicke et al. | 51/293 |
| 4,649,074 A | 3/1987 | Borel | 428/222 |
| 4,728,552 A | 3/1988 | Jensen, Jr. | 428/91 |
| 4,753,838 A | 6/1988 | Kimura et al. | 428/91 |
| 4,767,793 A | 8/1988 | Schisler et al. | |
| 4,771,078 A | 9/1988 | Schisler et al. | |
| 4,796,749 A | 1/1989 | Lefferts | 198/851 |
| 4,814,409 A | 3/1989 | Blevins, II et al. | |
| 4,828,542 A | 5/1989 | Hermann | |
| 4,841,680 A | 6/1989 | Hoffstein et al. | 51/283 R |
| 4,857,368 A | 8/1989 | Klein | |
| 4,882,363 A | 11/1989 | Neuhaus et al. | |
| 4,927,432 A | 5/1990 | Budinger et al. | 51/298 |
| 4,954,141 A | 9/1990 | Takiyama et al. | 51/296 |
| 4,962,562 A | 10/1990 | Englund et al. | 15/230.16 |
| 5,020,283 A | 6/1991 | Tuttle | 51/209 DL |
| 5,098,621 A | 3/1992 | Hermann | |
| 5,145,879 A | 9/1992 | Budnik et al. | |
| 5,177,908 A | 1/1993 | Tuttle | 51/283 R |
| 5,197,999 A | 3/1993 | Thomas | 51/298 |
| 5,212,910 A | 5/1993 | Breivogel et al. | 51/398 |
| 5,234,867 A | 8/1993 | Schultz et al. | 437/225 |
| 5,257,478 A | 11/1993 | Hyde et al. | 51/131.3 |
| 5,287,663 A | 2/1994 | Pierce et al. | 51/401 |
| 5,329,734 A | 7/1994 | Yu | 51/283 R |
| 5,334,622 A | 8/1994 | Bergvist | 521/74 |
| 5,401,785 A | 3/1995 | Kumagai et al. | |
| 5,487,697 A | 1/1996 | Jensen | 451/324 |
| 5,489,233 A | 2/1996 | Cook et al. | 451/41 |
| 5,491,174 A | 2/1996 | Grier et al. | |
| 5,514,456 A | 5/1996 | Lefferts | 428/222 |
| 5,525,640 A | 6/1996 | Gerkin et al. | |
| 5,534,106 A | 7/1996 | Cote et al. | 156/636.1 |
| 5,565,149 A | 10/1996 | Page et al. | |
| 5,578,362 A | 11/1996 | Reinhardt et al. | 428/147 |
| 5,602,190 A | 2/1997 | Lamberts et al. | |
| 5,604,267 A | 2/1997 | Duffy | |
| 5,605,760 A | 2/1997 | Roberts | 428/409 |
| 5,622,662 A | 4/1997 | Veiga et al. | |
| 5,692,947 A | 12/1997 | Talieh et al. | 451/41 |
| 5,735,731 A | 4/1998 | Lee | 451/143 |
| 5,789,454 A | 8/1998 | McVey | |
| 5,807,903 A | 9/1998 | Stanga et al. | |
| 5,844,010 A | 12/1998 | Burkhart et al. | |
| 5,859,081 A | 1/1999 | Duffy | |
| 5,883,142 A | 3/1999 | Chojnacki et al. | |
| 5,900,164 A | 5/1999 | Budinger et al. | |
| 6,019,919 A | 2/2000 | Sulzbach et al. | |
| 6,071,978 A | 6/2000 | Eisen et al. | |
| 6,169,122 B1 * | 1/2001 | Blizard et al. | 521/79 |

FOREIGN PATENT DOCUMENTS

| | | |
|---|---|---|
| EP | 0 696 495 | 2/1996 |
| EP | 0 645 226 B1 | 5/1997 |
| EP | 0 829 328 | 8/1998 |
| EP | 1 029 888 A1 | 8/2000 |
| GB | 2244714 | 12/1991 |
| WO | WO96/16436 | 5/1996 |
| WO | WO98/35786 | 8/1998 |

OTHER PUBLICATIONS

Fynn, G. et al, The Cutting and Polishing of Electro–Optic Materials, Halsted Press, 1979, Section 3.2.6, pp. 82–83.

* cited by examiner

*Primary Examiner*—M. Rachuba
(74) *Attorney, Agent, or Firm*—Proskauer Rose LLP; Kristin H. Neuman, Esq.

(57) ABSTRACT

A method for making high density foam semiconductor polishing pads and belts with controlled, reproducible microcellular structure by mechanical frothing. The method involves agitating a liquid polymer resin at a controlled temperature and pressure in order to produce a stable froth. Next, the resin froth is metered under pressure to a mix head where it is typically combined with a desired amount of curative before being injected or poured into a mold.

16 Claims, No Drawings

FOAM SEMICONDUCTOR POLISHING BELTS AND PADS

CROSS REFERENCE TO RELATED APPLICATIONS

This is a complete application of provisional application Serial No. 60/087,740, filed Jun. 2, 1998.

BACKGROUND OF THE INVENTION

The purpose of this invention is to provide improved foam semiconductor polishing pads and belts by a novel method of mechanical frothing.

State-of-the-art semiconductor polishing pads are high density polyurethane foams that have a functional porous structure, which aids the distribution of polishing slurry and reduces hydroplaning, for example. The state-of-the art pads for semiconductor polishing are foamed by the inclusion of thin-walled, hollow plastic beads, which can potentially provide a controlled and consistent microcellular structure.

However, there are some limitations to the use of hollow microspheres in polishing pads. The hollow microspheres are typically limited in the sizes available, and they may be too abrasive for some delicate polishing operations, like certain steps in semiconductor manufacturing, including but not limited to chemical/mechanical polishing of soft metal layers. Typically the microspheres are extremely light weight and flammable, posing significant material handling difficulties, including dust explosion hazards. The light weight microspheres are difficult to disperse in the polyurethane resins, they tend to clump and foul process equipment, and they often entrain significant amounts of air, which leads to problematic variations in porosity of the cured foam. Also, the microspheres can distort, collapse, or melt if processed at certain high temperatures, that are routinely used in processing polyurethanes and other potential pad materials.

Although there are several different ways to create conventional high density polyurethane foam, including mechanical frothing and chemical blowing processes, pads produced by the conventional methods have not been successful in semiconductor polishing. In fact, lower technology pads for polishing glass have been produced by chemical blowing for many years, but they have not been as successful in semiconductor polishing, which is a more precise and more delicate application, because of the variability in pad cell structure and pad properties.

SUMMARY OF THE INVENTION

This invention comprises high density foam semiconductor polishing pads and belts with a controlled, reproducible micro-cellular structure that have been produced by a novel method of mechanical frothing. This invention provides an improved method for producing semiconductor polishing pads with consistent cell structure and properties, that perform equal to or better than the state-of-the-art polishing pads. The method also provides increased degrees of freedom and convenience in producing pads with different desired cell structures.

BRIEF DESCRIPTION OF THE INVENTION

This invention comprises a method for making high density foam semiconductor polishing pads and belts with controlled, reproducible microcellular structure by mechanical frothing. The method involves agitating a liquid polymer resin at a controlled temperature and pressure in order to produce a stable froth. Next, the resin froth is metered under pressure to a mix head where it is typically combined with a desired amount of curative before being injected or poured into a mold. This invention also relates to the high density polishing pads and belts produced by the method.

The resin material is typically polyurethane but can be any suitable thermoset polymeric material. In the case of urethanes, any suitable formulation is acceptable, including the incorporation or utilization of various fillers, catalysts, additives, and surfactants. Catalysts and blowing agents can be used to create an open-celled structure in the polishing pad or to enlarge the cells after the mixture is poured into the mold. It has been found that nucleation surfactants, that are commonly used in the manufacture of low density blown foams, are surprisingly useful for producing a stable froth, which is critical to the present invention. One particularly useful nucleating surfactant is a block copolymer containing at least one block comprising polydimethylsiloxane and at least one other block comprising polyether, polyester, polyamide, or polycarbonate segments. The stable froth produced with the aid of the nucleation surfactants forms easily with simple agitation schemes and maintains its integrity when put through processing equipment with varying temperatures, pressures, and shear conditions.

Any suitable gas can be used as the frothing agent. Typically, dry nitrogen or dry air are used in the head space of the resin frothing vessel. Different cell sizes and different overall densities or porosities can be achieved by selecting the process temperatures, pressures, and agitation schemes. Different pressures can be used at different points or times in the process. For example, frothing, dispensing, and molding pressures can all be different. Preferably the stable froth is produced at a temperature of ambient to 100° C. and at a pressure of ambient to 100 psig. Preferably the stable froth is metered to the mix head under a pressure of ambient to 200 psig.

Various mold or tooling designs may be employed to aid in maintaining or controlling the overall foam density and cell structure of the molded part.

Any suitable mixing, foaming, or dispensing equipment is acceptable, including those utilizing recirculation schemes.

An alternative variation of the present invention involves preparing the stable froth in continuous or semicontinuous fashion, in-line between a resin holding tank and the dispensing mix head.

The following non-limitative examples illustrate the invention:

EXAMPLE 1

Batch Preparation: Add 40,000 g of Adiprene® LF 750D from Uniroyal Chemical Company, urethane prepolymer, to a process tank equipped with heating and variable speed agitation. Add 2,000 g of UAX-6123, a nucleating surfactant from Witco Corporation. Pressurize tank with nitrogen at 7 psig, agitate with simple impeller to create moderate vortex, and heat to 150° F.

Dispensing: Stop agitation of resin mixture, and pressurize with nitrogen to 50 psig. In a separate process tank, pressurize Ethacure® 300, diamine curative from Albemarle Corporation, with nitrogen to 50 psig. Dispense and thoroughly mix resin mixture and curative simultaneously in a ratio of 102 parts to 21.5 parts by weight. Adjust back pressure in mixhead to avoid cavitation and to allow smooth dispensing and expansion of the foam. The resultant microcellular foam has approximately 0.68 specific gravity.

EXAMPLE 2

Batch Preparation: Add 40,000 g of Adiprene® LF 750D from Uniroyal Chemical Company, urethane prepolymer, to a process tank equipped with heating and variable speed agitation. Add 200 g of UAX-6123, a nucleating surfactant from Witco Corporation. Pressurize tank with nitrogen at 4 psig, agitate with simple impeller to create moderate vortex, and heat to 150° F.

Dispensing: Stop agitation of resin mixture, and pressurize with nitrogen to 50 psig. In a separate process tank, pressurize Ethacure® 300, diamine curative from Albemarle Corporation, with nitrogen to 50 psig. Dispense and thoroughly mix resin mixture and curative simultaneously in a ratio of 100.5 parts to 21.5 parts by weight. Adjust back pressure in mixhead to avoid cavitation and to allow smooth dispensing and expansion of the foam. The resultant microcellular foam has approximately 0.92 specific gravity.

EXAMPLE 3

Batch Preparation: Add 25,139 g of Adiprene® LF 750D from Uniroyal Chemical Company, urethane prepolymer, to a process tank equipped with heating and variable speed agitation. Add 1,295 g of UAX-6123, a nucleating surfactant from Witco Corporation. Pressurize tank with nitrogen at 50 psig, agitate with simple impeller to create moderate vortex, and heat to 150° F.

Dispensing: Stop agitation of resin mixture, and dispense foam only at 50 psig. The resultant uncured microcellular foam is very stable, with no apparent coalescence or separation. The uncured foam has approximately 0.41 specific gravity.

I claim:

1. A high density, microcellular polishing pad or belt with consistent cell structure and properties, produced by combining a thermosettable liquid polymer or prepolymer resin and a nucleation surfactant, agitating the resin mixture in the presence of a frothing agent at a controlled temperature and pressure in order to produce a stable resin froth, metering the resin froth under pressure to a mix head, optionally combining the resin froth with a curative, injecting or pouring the resin froth into a mold; said polishing pad or belt being free of hollow polymeric microelements or microballoons.

2. The product of claim 1, wherein the resin is a polyurethane.

3. The product of claim 1, wherein a catalyst and a blowing agent are combined with the resin to create an open-celled structure or to enlarge the cells after the mixture is injected or poured into the mold.

4. The product of claim 1, wherein the nucleation surfactant is a block copolymer containing at least one block comprising polydimethylsiloxane, and at least one other block comprising polyether, polyester, polyamide, or polycarbonate segments.

5. The product of claim 1, wherein the frothing agent is dry nitrogen or dry air.

6. The product of claim 5, wherein the frothing agent is used in the head space of a resin frothing vessel.

7. The product of claim 1, wherein the resin froth is produced at a temperature of ambient to 100° C., and at a pressure of ambient to 100 psig.

8. The product of either claim 1 or claim 7, wherein the resin froth is metered to the mix head under a pressure of ambient to 200 psig.

9. The product of claim 1, wherein resin froth is prepared in continuous or semi-continuous fashion, in-line between a resin holding tank and a dispensing mix head.

10. The product of claim 1, wherein the nucleation surfactant comprises a polyalkyleneoxidemethylsiloxane copolymer.

11. The product of any one of claims 1, 4 and 10, wherein the nucleation surfactant and the liquid polymer or prepolymer resin are present in a ratio of about 5 parts by weight of the nucleation surfactant to about 100 parts by weight of the liquid polymer or prepolymer resin.

12. The product of any one of claims 1, 4 and 10, wherein the nucleation surfactant and the liquid polymer or prepolymer resin are present in a ratio of about 0.5 parts by weight of the nucleation surfactant to about 100 parts by weight of the liquid polymer or prepolymer resin.

13. The product of claim 1, wherein a curative is used, and the curative is a diamine.

14. The product of claim 1, wherein a curative is used, and the resultant microcellular foam has approximately 0.68 specific gravity.

15. The product of claim 1, wherein a curative is used, and the resultant microcellular foam has approximately 0.92 specific gravity.

16. The product of claim 1, wherein a curative is not used, and the resultant microcellular foam has approximately 0.41 specific gravity.

* * * * *